United States Patent Office 3,634,445
Patented Jan. 11, 1972

3,634,445
SUBSTITUTED TRIAZOLIDINE DERIVATIVES
Albrecht Zschocke, Bad Durkheim, and Adolf Fischer, Mutterstadt, Germany, assignors to Badische Anilin- & Soda-Fabrik Aktiengesellschaft, Ludwigshafen (Rhine), Germany
No Drawing. Filed July 24, 1969, Ser. No. 844,633
Claims priority, application Germany, Aug. 2, 1968,
P 17 95 050.4
Int. Cl. A01n 9/02, 9/22; C07d 55/06
U.S. Cl. 260—308 C     3 Claims

ABSTRACT OF THE DISCLOSURE

New and valuable substituted triazolidine derivatives which are substituted by phenoxycarboxylic acid radicals and a process for controlling the growth of unwanted plants with these compounds.

---

The present invention relates to new and valuable substituted triazolidine derivatives and a process for controlling the growth of unwanted plants with these compounds. It is known to use phenoxy fatty acid derivatives as herbicidal agents; the disadvantage of these agents is, however, that they only have a poor action on grass weeds. An object is new and valuable substituted triazolidine derivatives which have a good herbicidal action, particularly on millet species, without damaging crop plants. A further object of the invention is a process for controlling unwanted plants without damaging crop plants. These and other objects of the invention are achieved by substituted triazolidine derivatives having the formula

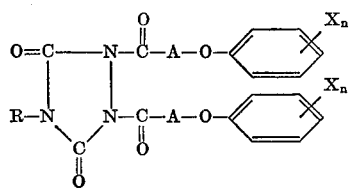

where R denotes a phenyl radical which may be substituted by halogen (fluorine, chlorine, bromine, iodine), nitro, methylsulfonyl, trifluoromethyl, lower alkyl (methyl, ethyl, propyl, isopropyl, butyl, isobutyl, tert-butyl) or lower alkoxy groups (methoxy, ethoxy, propoxy, isopropoxy), A denotes a branched or linear alkylene radical having one to three carbon atoms

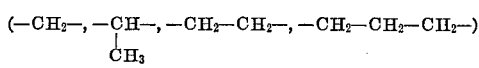

X denotes chlorine or a methyl group and $n$ denotes one of the integers 0, 1, 2 and 3.

The following experimental data illustrate the production of the compounds according to the invention; they may be produced by reaction of triazolidine derivatives with phenoxy fatty acid halides.

Production of 1,2-bis-(2′,4′-dichlorophenoxyacetyl)-4-phenyl-1,2,4-triazolidine-3,5-dione.

8.8 parts (by weight) of 4-phenyl-1,2,4-triazolidine-3,5-dione is suspended in 100 parts of toluene and 10 parts of triethylamine; 23.9 parts of 2,4-dichlorophenoxyacetic acid chloride is then added at a temperature of 20° to 30° C. The mixture is subsequently kept for sevral hours at a temperature of 75° C. After cooling, 100 parts of water is added to the mixture and the reaction product suction-filtered. After washing with water and drying, 27 parts of 1,2-bis-(2′,4′-dichlorophenoxyacetyl)-4-phenyl-1,2,4-triazolidine-3,5-dione having a melting point of 190° C. is obtained.

The other active ingredients may be prepared by similar processes, e.g. with the meanings

| R | A | X | n | B.P., °C. |
|---|---|---|---|---|
| ⟨phenyl⟩— | —CH$_2$— | 2-CH$_3$, 4-Cl | 2 | 209–211 |
| Cl—⟨phenyl⟩— | —CH$_3$— | 2-CH$_3$, 4-Cl | 2 | 213–215 |

The production of the substituted 1,2,4-triazolidine-3,5-diones used as starting material is described in Archiv der Pharmazie 294, 370 (1961).

The agents for regulating plant growth according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents, such as polyethylene oxide adducts. Concentrates which are suitable for dilution with water may be prepared from active ingredients, emulsifying or dispersing agent and possibly solvent.

Dusts may be prepared by mixing or grinding the active ingredients with a solid carrier, e.g. clay, talc, diatomaceous earth or fertilizer. It is also possible to add insecticides, fungicides, bactericides, growth regulators and other herbicides.

The following comparative experiments demonstrate the superiority of the compositions according to this invention over known active ingredients.

EXAMPLE 1

In a greenhouse, the plants rice (*Oryza sativa*), wheat (*Triticum vulgare*), barley (*Hordeum vulgare*), white goosefoot (*Chenopodium album*), small nettle (*Urtica urens*), wild mustard (*Sinapis arvensis*), chickweed (*Stellaria media*), camomile (*Matricaria chamomilla*), annual meadow grass (*Poa annua*) and barnyrd grass (*Panicum crus-galli*) are treated at a growth height of 2 to 15 cm. with 2 kg. per hectare of 1,2-bis-(2′,4′-dichlorophenoxyacetyl)-4-phenyl - 1,2,4 - triazolidine-3,5-dione I and, for comparison, with 2 kg. per hectare of the dimethylamine salt of 2,4-dichlorophenoxyacetic acid II, these amounts of the active ingredients each being dispersed or dissolved in 500 liters of water per hectare. After three weeks it is ascertained that I has superior herbicidal action and crop plant compatibility over II.

The results of the experiment may be seen from the following table:

|  | Active ingredient | |
|---|---|---|
|  | I | II |
| Rice | 10 | 30–40 |
| Wheat | 10 | 20 |
| Barley | 10 | 20 |
| White goosefoot | 90–100 | 90–100 |
| Small nettle | 90–100 | 90–100 |
| Wild mustard | 90–100 | 90–100 |
| Chickweed | 90 | 50–60 |
| Annual meadow grass | 80 | 30 |
| Camomile | 80–90 | 50 |
| Barnyard grass | 80 | 20–30 |

NOTE.—0=no damage; 100=total destruction.

EXAMPLE 2

Loamy sandy soil is filled into pots and sown with the seeds of wheat (*Triticum vulgare*), barley (*Hordeum vulgare*), white goosefoot (*Chenopodium album*), small nettle (*Urtica urens*), wild mustard (*Sinapis arvensis*), chickweed (*Stellaria media*) and poppy (*Papaver rhoeas*). The soil is then treated with 3 kg. per hectare of 1,2-bis-(2',4' - dichlorophenoxyacetyl) - 4 - phenyl - 1,2,4 - triazolidine-3,5-dione I dispersed in 500 liters of water per hectare.

After three to four weeks it is ascertained that the weeds white goosefoot, small nettle, wild mustard, chickweed and poppy are completely withered, whereas barley and wheat continue to grow almost undamaged.

If larger amounts are used, the active ingredients may also be used as total herbicides.

The following active ingredients have the same good biological action as I in Examples 1 and 2:

1,2-bis-(2'-methyl-4'-chlorophenoxyacetyl)-4-phenyl-1,2,4-triazolidine-3,5-dione;
1,2-bis-(2',4'-dichlorophenoxy-α-methylacetyl)-4-phenyl-1,2,4-triazolidine-3,5-dione;
1,2-bis-(2',4'-dichlorophenoxyacetyl)-4-(3'-trifluoromethylphenyl)-1,2,4-triazolidine-3,5-dione;
1,2-bis-(2',4'-dichlorophenoxyacetyl)-4-(3'-chlorophenyl)-1,2,4-triazolidine-3,5-dione;
1,2-bis-(2',4'-dichlorophenoxy-α-methylacetyl)-4-(3',4'-dimethylphenyl)-1,2,4-triazolidine-3,5-dione;
1,2-bis-(2'-methyl-4'-chlorophenoxyacetyl)-4-(3'-nitrophenyl)-1,2,4-triazolidine-3,5-dione;
1,2-bis-(2',4'-dichlorophenoxyacetyl)-4-(3'-methylsulfonylphenyl)-1,2,4-triazolidine-3,5-dione.

We claim:
1. A triazolidine derivative having the formula

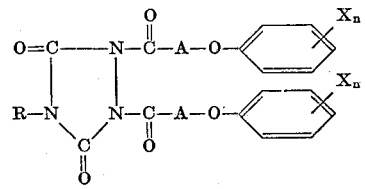

where R denotes a phenyl radical which may be substituted by halogen, nitro, methylsulfonyl, trifluoromethyl, lower alkyl or lower alkoxy groups, A denotes a branched or linear alkylene radical having one to three carbon atoms, X denotes chlorine or a methyl group and $n$ denotes one of the integers 0, 1, 2 and 3.

2. 1,2-bis-(2',4'-dichlorophenoxyacetyl) - 4 - phenyl-1,2,4-triazolidine-3,5-dione.

3. 1,2 - bis - (2' - methyl - 4' - chlorophenoxyacetyl)-4-phenyl-1,2,4-triazolidine-3,5-dione.

References Cited

Zinner et al., Arch. Pharm., vol. 299, pp. 441–447 (1966).

ALTON D. ROLLINS, Primary Examiner

U.S. Cl. X.R.

71—92